US006795760B2

(12) United States Patent
Fuller

(10) Patent No.: US 6,795,760 B2
(45) Date of Patent: Sep. 21, 2004

(54) METHOD AND APPARATUS FOR A CUSTOMIZED AUTOMOTIVE FEATURE SET

(76) Inventor: Michael G. Fuller, 1480 Constanso Way, San Jose, CA (US) 95129

( * ) Notice: Subject to any disclaimer, the term of this patent is extended or adjusted under 35 U.S.C. 154(b) by 168 days.

(21) Appl. No.: 10/143,270

(22) Filed: May 9, 2002

(65) Prior Publication Data

US 2003/0212481 A1 Nov. 13, 2003

(51) Int. Cl.[7] ............................ B60R 1/00; G06F 13/00

(52) U.S. Cl. .......................... 701/36; 701/49; 307/10.1; 307/10.4; 340/426.27

(58) Field of Search .............................. 701/36, 32, 49; 307/10.1, 10.4; 340/426.16, 426.17, 426.27, 5.64; 341/176

(56) References Cited

U.S. PATENT DOCUMENTS

| | | | | |
|---|---|---|---|---|
| 4,467,249 A | | 8/1984 | Swearingen, Jr. | 318/282 |
| 4,598,237 A | | 7/1986 | Wada et al. | 318/16 |
| 4,694,408 A | | 9/1987 | Zaleski | 701/33 |
| 5,278,547 A | | 1/1994 | Suman et al. | 701/99 |
| 5,523,948 A | | 6/1996 | Adrain | 340/5.22 |
| 5,787,371 A | | 7/1998 | Balukin et al. | 701/19 |
| 5,808,374 A | * | 9/1998 | Miller et al. | 307/10.1 |
| 6,028,537 A | | 2/2000 | Suman et al. | 340/998 |
| 6,356,823 B1 | * | 3/2002 | Iannotti et al. | 701/35 |

* cited by examiner

*Primary Examiner*—Thomas G. Black
*Assistant Examiner*—Arthur D. Donnelly
(74) *Attorney, Agent, or Firm*—Blakely, Sokoloff, Taylor & Zafman LLP

(57) ABSTRACT

A method and system for modifying vehicle function are disclosed. Upon receiving an indication of an event initiated by an automobile user, an additional automobile feature corresponding to the event is determined. In addition, an automobile module is directed via a diagnostic port of an automobile to perform the additional feature.

45 Claims, 5 Drawing Sheets

METHOD AND APPARATUS FOR A CUSTOMIZED AUTOMOTIVE FEATURE SET

FIELD OF THE INVENTION

The invention relates generally to the field of electronic automobile control and more specifically to the field of modifying vehicle function and response according to selected events.

BACKGROUND

Vehicle manufacturers build increasingly greater functionality into today's automobiles. Among those functions are remote keyless entry, whereby a key fob signals a receiver in the car to unlock one or more doors. Quickly pressing and releasing the control for an electrically driven window can cause the window to raise or lower to its extreme position. Deactivating the ignition sends power to the radio until the key is removed or a door is opened. These are examples of the increased functions available in a modern automobile.

Many of these functions are built into the automobile at the time of manufacture or at the time of sale. One problem with this approach arises when an automobile user wants to add functions at a later date. A number of aftermarket devices add functionality to an automobile. In some cases the on-board computer is reprogrammed with the additional functionality. In other cases the automobile is disassembled to some extent so that hardware components can be added to provide the additional functionality, or in order to rewire and reprogram the existing hardware.

There are several problems with these approaches. First, reprogramming the on-board computer or existing hardware requires the services of a trained technician whom the automobile user must seek out each time they want to change the functionality of the automobile. Second, both reprogramming and adding hardware require tools and expertise that the average user does not posses. Third, adding hardware tends to be time-consuming for the average user or costly, if the user employs a technician. Fourth, functionality installed in one automobile is not easily transferred to another. Fifth, none of the methods inhibit quick or easy changes to vehicle functionality, such as when a different user drives the automobile and wants to disable a function.

What is needed is a device that adds functionality to the automobile and is easily installed by the average user.

SUMMARY OF THE INVENTION

The present invention includes a system and method for modifying a vehicle function. The method comprises receiving an indication of an event initiated by an automobile user; determining an additional automobile feature corresponding to the event; and directing an automobile module via a diagnostic port of an automobile to perform the addition feature.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous specific details are set forth in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

A method and apparatus for customizing a feature set of an automobile are described. In one embodiment, a device is described which when connected to a diagnostic port of an automobile allows the user to customize automotive features of the automobile.

Exemplary Architecture

Figure 1:
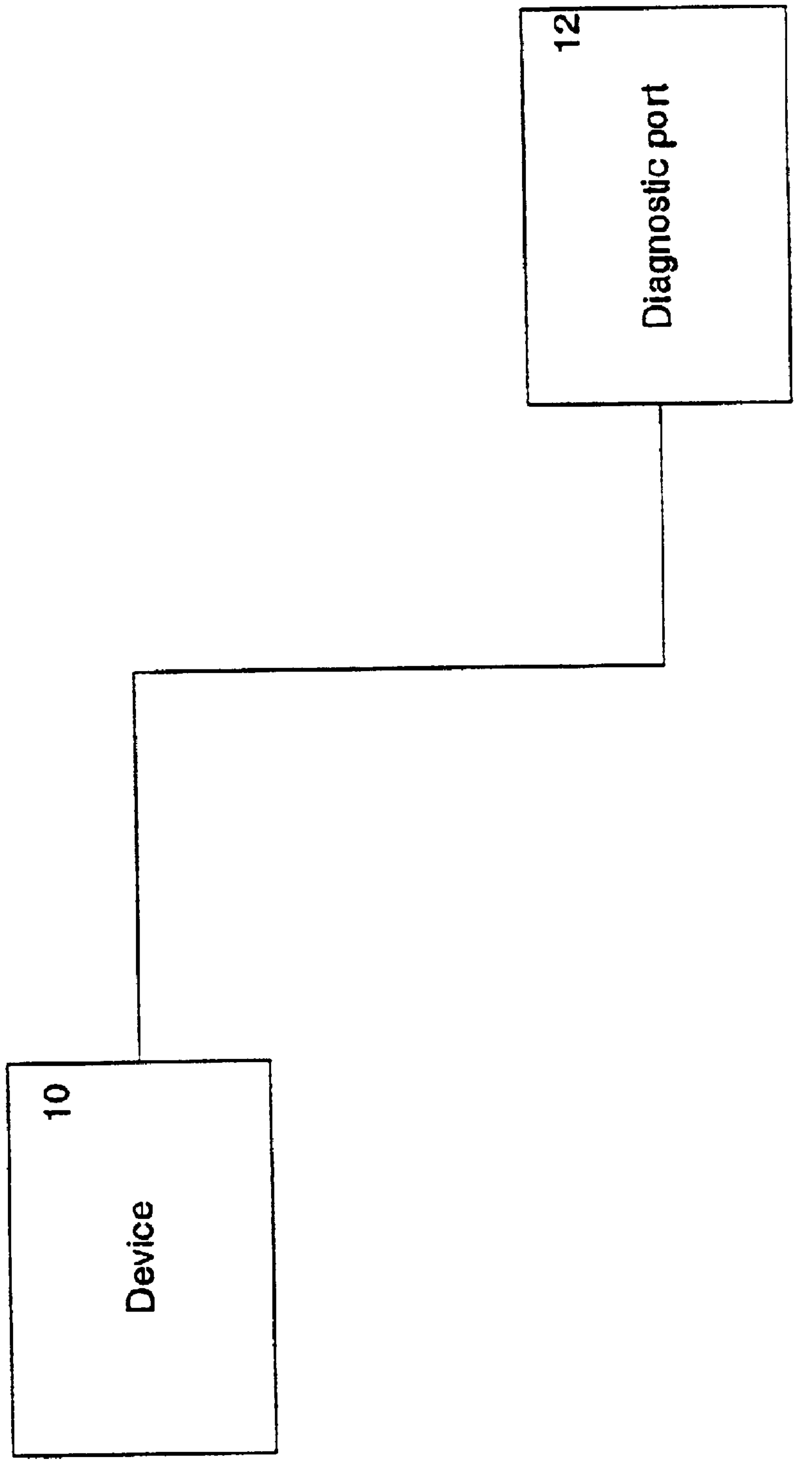
FIG. 1 illustrates a high level system architecture according to one embodiment of the invention.

FIG. 1 illustrates a system architecture according to one embodiment of the present invention. Device 10 couples to a diagnostic port 12 of an automobile. In one embodiment, the diagnostic port 12 is an on-board diagnostic-II (OBD-II) port coupled to the automobile's electrical system and computers through a bus line, and conforming to Title 13 California Code 1968.1 titled "Malfunction and Diagnostic System Requirements-1994 and Subsequent Model-Year Passenger Cars, Light-Duty Trucks, and Medium-Duty Vehicles and Engines," filed on Aug. 27, 1990 to Air Resource Board (ARB). In another embodiment the diagnostic port 12 is any link to the wiring harness or bus line connecting the electrical components of the automobile to one another.

Figure 2:
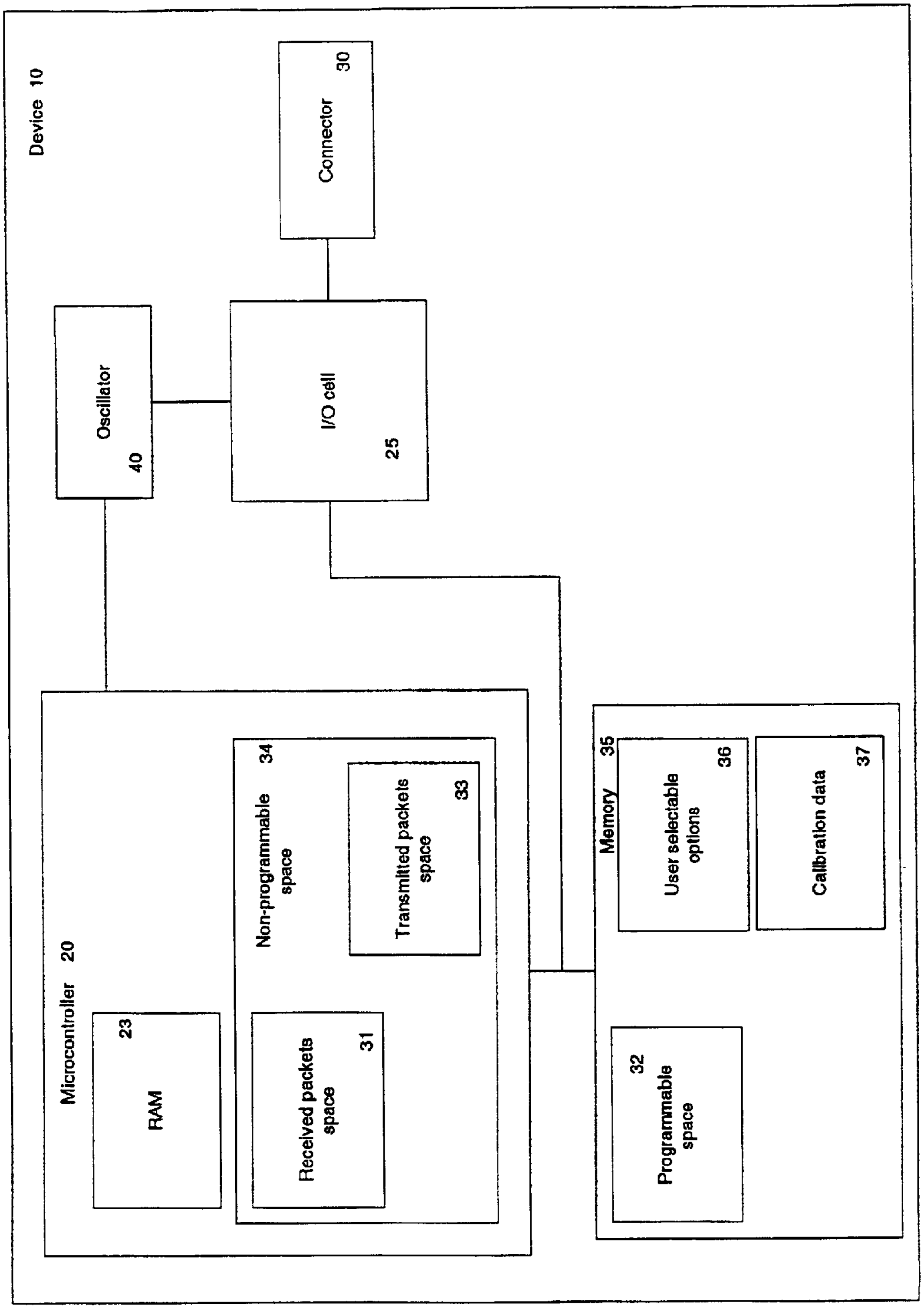
FIG. 2 illustrates components of a described device according to one embodiment of the invention.

FIG. 2 illustrates components of the device 10 according to one embodiment of the present invention. Device 10 includes a microcontroller 20, which couples to the diagnostic port 12 through an I/O cell 25 and a connector 30, all of which are mounted on a printed circuit board (PCB, not shown). The microcontroller 20 and the I/O cell 25 are coupled to a memory 35, where initialization and configuration data is stored in calibration data 37 to be used by the microcontroller 20. In one embodiment the microcontroller 20 has a built-in Erasable Programmable Read Only Memory (EPROM) for storing program instructions, which implement a protocol for a particular automobile, for example, a Chevrolet Corvette. An oscillator 40 couples to the microcontroller 20 and provides a clock signal of a frequency selected to operate with the microcontroller 20. In one embodiment, the connector 30 has three contacts (not shown) that couple with a power line, a ground line, and a data bus line (not shown) of the diagnostic port 12. In one embodiment the microcontroller 20 has three IO lines for interfacing to external devices in order to minimize the size of the device. In order to allow the microcontroller 20 to interface to the diagnostic port 12 as well as the on-board memory 35 used to store configuration data, the IO lines may be shared between the on-board memory 35 and the diagnostic port's IO cell. The IO cell may have input and output lines from the microcontroller 20 available. In addition, the memory 35 may require two lines. In one embodiment since four lines may be needed and only three are available, one IO line may be shared as described below. This is possible by restricting when communications occur between the microcontroller 20 and memory 35 and the diagnostic port. Full communications are allowed with OBD-II port (without disturbing the memory 35) by holding the memory data line high at all times. When a communication session is required with the memory 35, the data line is allowed to transition as necessary, but the clock line (shared with the diagnostic port output) is operated to the memory 35 specification (but quickly so that the IO cell does not have time to respond). In this embodiment both devices may operate without contention of the other.

In one embodiment, the microcontroller 20 is the PIC12C672 device provided by MicroChip Technology, Inc. of Chandler, Ariz. In one embodiment the memory 35 is electrically erasable programmable read only memory (EEPROM) LC2401B from MicroChip Technology, Inc. Alternatively, the microcontroller chip may be a dual in-line package (DIP-8) with the similar feature set. It will be appreciated that the microcontroller 20 and the memory 35 are not limited to the ones listed above and may be any products capable of performing the same or similar functions as described below.

In one embodiment the IO cell 25 of FIG. 2 interfaces the microcontroller 20 to the automobile diagnostic port's bus in accordance with electrical requirements described in a corresponding specification published by the Society of Automotive Engineering. In one embodiment the diagnostic port's bus is an OBD-II bus, electrical requirements of which are described in the SAE-J1850 specification titled "Class B Network Communications Interface." In summary, the microcontroller's voltage levels, thresholds, and edge rates may be different and may need to be adjusted for compatibility with the automobile's bus. The IO cell 25 may interface with the microcontroller 20 through two digital signals: one input and one output. The automobile side, i.e. diagnostic port's electrical connection, is a single bi-directional line that meets the electrical requirements of the diagnostic port's bus. In one embodiment of the invention, the IO cell 25 drives the OBD-II bus at voltages being 8V high, and 0V low when commanded by the microcontroller's digital output signal. The IO cell 25 may read the diagnostic port's bus and send a 5 V high or 0V low digital signal. In one embodiment the microcontroller 20 can read the input signal even when driving the output signal. This may allow the microcontroller to detect bus contention to support the bit-by-bit arbitration requirements of the OBD-II spec.

Exemplary Housing

Diagnostic ports are often found in an automobile's interior, accessible beneath the dashboard in front of the driver, or possibly behind an ashtray cover. Given the position of a typical diagnostic port, a device connecting to the port may need to have a small profile in order to avoid intruding into the driver's space and interfering with automobile operation. Furthermore, if the device is too heavy then it may fail to maintain good electrical contact with the port in light of the vibration, temperature change and acceleration experienced in the automobile, and may fall out of the port entirely, disturbing the driver and causing a loss of functionality.

Figure 3:
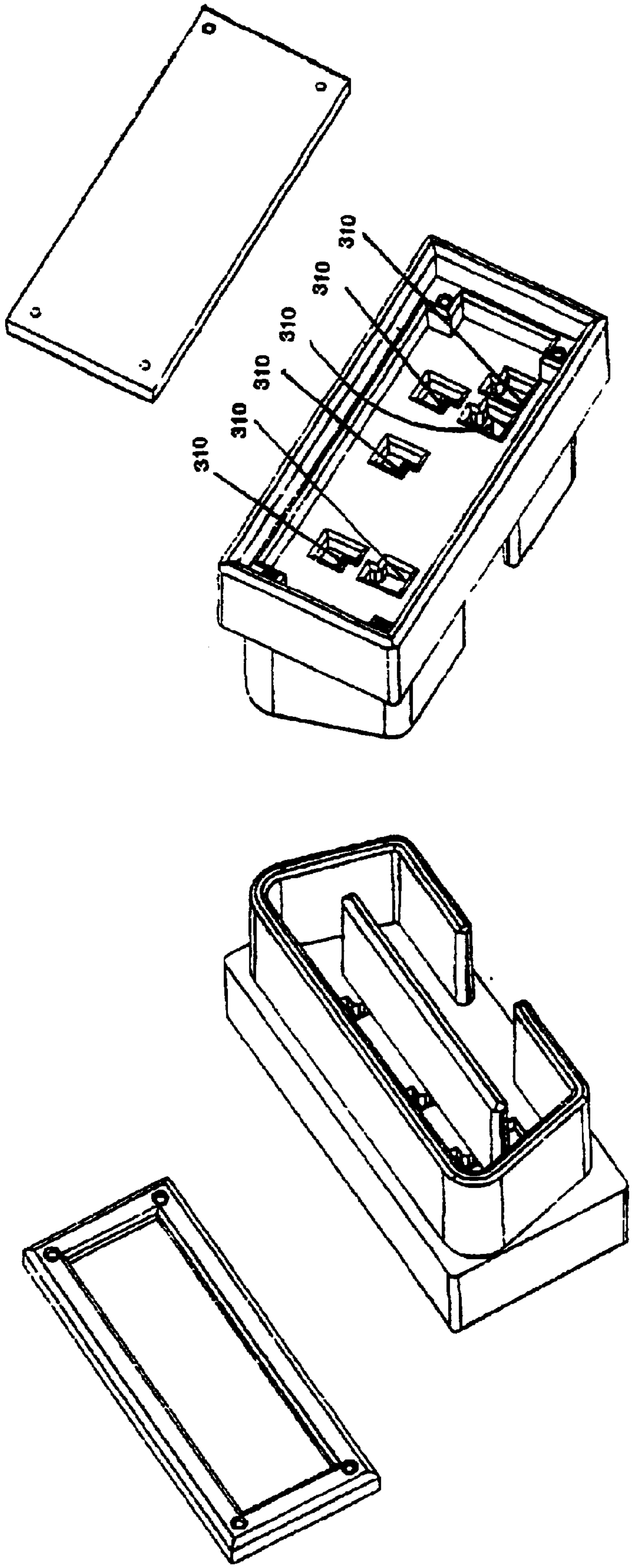
FIG. 3 illustrates a device housing according to one embodiment of the invention.

FIG. 3 shows one embodiment of a housing sized and shaped to hold the device 10, mounted on a printed circuit board of approximately 1.5 by 0.6 inches in dimensions. In this embodiment, the housing may guide electrical contacts through openings 310 to mate with a diagnostic port. It will be appreciated that the present invention is not limited to the housing illustrated in FIG. 3, the housing may be smaller, larger or differently shaped. Moreover, it will be noted that the present invention is not limited to any number of pins and the housing may be modified to include any number of pins to make the device compatible with any number of automobile designs.

Device Features Activation Methodology

Figure 4:
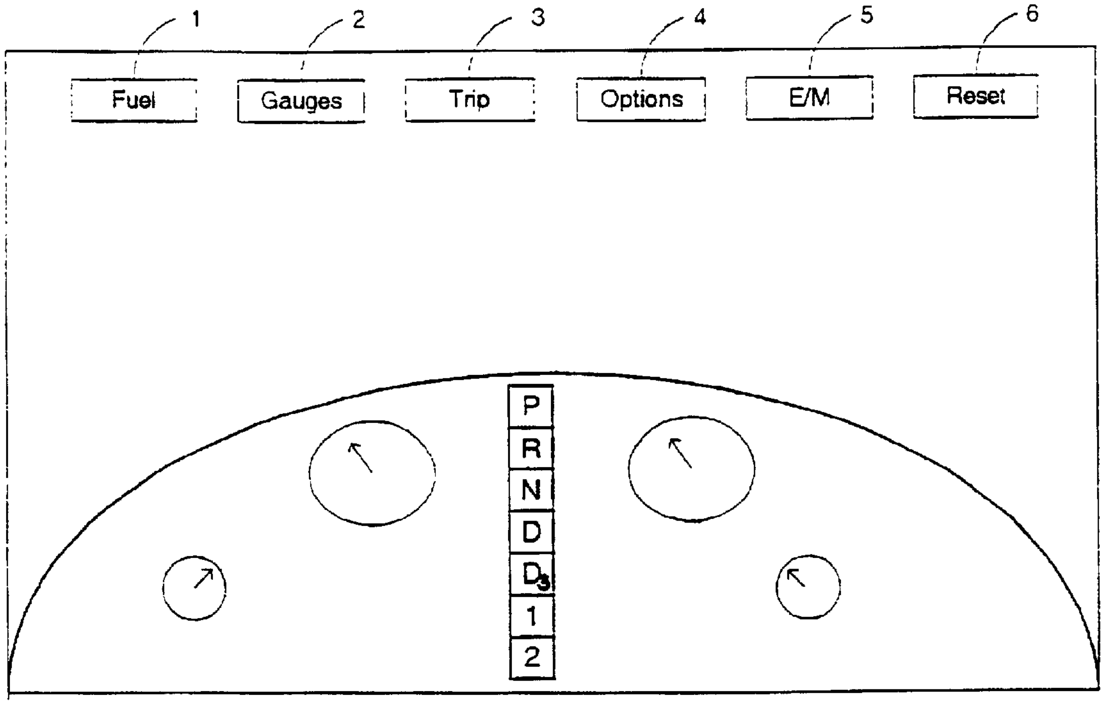
FIG. 4 illustrates a driver's information center according to one embodiment of the invention.

In one embodiment of the present invention a user of an automobile may activate the features of the device 10 utilizing various buttons on a dashboard of the automobile. For example, FIG. 4 illustrates an exemplary Driver's Information Display of an automobile, e.g., a fifth generation Chevrolet Corvette model year 1997. The automobile's user buttons may include 1-Fuel, 2-Gauges, 3-Trip, 4-Options, 5-E/M (English/Metric), and 6-Reset. In one embodiment when the key is removed from the ignition of the car, pressing of the buttons (except for the Reset button) does not generate any diagnostic port's bus activity. When the Reset button is pressed, the diagnostic port's bus activity is generated.

Configuration of the Device

To configure various options, and access certain features of the device 10, a sequence of button events may be entered, generating diagnostic port's bus activity. In order to direct the device 10 to enter into the configuration mode, the user may hold down the Reset button on the Driver's Information Center (DIC) and press the unlock button on the driver's door. Once in configuration mode, an instrument panel cluster (IPC) may chime three times in succession and the tachometer may display 1000 RPM in order to inform the user that the device is ready to accept users commands. At this point, the IPC is now in diagnostics mode and the device 10 has control over all gauges and can directly read all the user buttons. In one embodiment, the device 10 enters the configuration mode upon the user pressing the Reset button three times in a succession. In one embodiment if more than one second of time elapses between any two of the three resets, the reset counter starts over. This is to say that reset-reset-reset will cause configuration mode to be entered, but reset-reset-delay-reset will not.

In one embodiment of the invention, once in the configuration mode, pressing the Option button 4 by the user causes the device 10 to enter into the second level menu where features of the device 10 can be selectively enabled and disabled by the user. In the second level menu, the tachometer displays 2000 RPM to notify the user that the input was accepted. For example, pressing the Fuel button 1 selects the remote window control menu and the tachometer displays 3000 RPM to inform the user that the command was accepted by the device 10. From the remote window control menu, several options are available according to one embodiment. Pressing the Fuel button 1 disables the remote control of the power windows. Pressing the Gauges button 2 enables the function. In one embodiment the enabling the function is contingent on the user reading and understanding the safety warnings for moving power windows. To ensure that the user has read the warnings, a pin number is included in the warning message that may be entered to enable the feature. The pin number may only be required to enable the feature; the feature may be disabled without the pin number. It will be appreciated that the present invention is not limited to an activation method described above and any sequence of pressed buttons may be utilized to enable or disable particular features of the device 10.

It will be appreciated that the user may configure the device 10 by specifying which buttons or sequence of buttons activate which feature of the device 10. The user specified buttons or sequence of buttons may be stored in a user selectable options 36 of FIG. 2. In addition, it will be noted that variety of other configuration/activation features may be presented to the user.

Invocation of the Features

In one embodiment of the present invention, the user actives a panic mode feature of the device 10 by pressing Panic button 1 of FIG. 4. The panic feature locks the tachometer and speedometer needle in a particular position. In one embodiment the needles may be locked in a random position. In another embodiment the needles may be locked at a user-specified position. In yet another embodiment, the needles may be locked in a random position within a user-specified values.

In one embodiment of the present invention, the user activates a high speed mode by pressing Gauges button 2 on the Driver's Information Center. The high speed mode will display the highest speed at which an automobile was driven since the last time the user cleared the speed readings maintained by the device 10. For speeds over 100 MPH the tachometer may read 1000 RPM to indicate that 100 MPH should be added to the speed displayed on the speedometer. For example, if the high speed is 137 MPH, the speedometer may display 37 MPH and the tachometer may display 1000 RPM. If the highest speed is 65 MPH, then the speedometer may display 65 MPH and the tachometer may display 0 RPM. The user may clear the speed recordings by pressing the Fuel button 1. The user may exit the high speed mode by pressing the Reset button.

In one embodiment of the present invention the user may activate the Retained Accessory Power mode by pressing the Trip button 3 on the Driver's Information Center. The Retained Accessory Power (RAP) enables accessory power when a key is absent from the ignition. For example, when the RAP is enabled the power to the radio is maintained even when the automobile doors are opened. In one embodiment pressing of the Reset button disables the RAP features. In another embodiment the RAP feature may be disabled by the device 10 upon expiration of a particular time interval. The time interval may be specified by the user during the configuration of the device 10, for example, the time interval may be set to 30 seconds, 5 minutes, 15 minutes, etc. The RAP feature may also be disabled with a remote key fob, for example, by pressing "lock" button or "unlock" button.

In one embodiment of the present invention, the user enables the remote power window control feature by pressing the unlock button three times in rapid succession on the remote key fob. Upon the user pressing the unlock button three times in succession, the device 10 will lower both the driver's and passenger's windows to their fully lowered positions. In one embodiment, the device 10 may cause the windows to be raised upon the user pressing the lock button three times in rapid succession on the remote key fob. In one embodiment, if there is a delay between each push of an unlock or lock button the remote power window control feature is not activated in order to distinguish between an unlock/lock operation and an invocation of a remote power window control feature. In one embodiment the device 10 detects obstructions in the windows' paths when the user presses the lock button three times in order to raise the windows. If the device 10 detects an obstruction, both windows are immediately lowered. Detection of the obstruction is described in detail below.

In one embodiment the device 10 may unlock the doors upon occurrence of a particular event such as placing an automatic transmission in park, setting the hand brake or pressing of buttons on DIC or remote key FOB in a particular succession.

It will be appreciated that the present invention is not limited to additional features activation methods described above and any sequence of pressed buttons may be utilized to enable or disable particular features of the device 10.

Exemplary Device Features Performing Methodology

Figure 5:
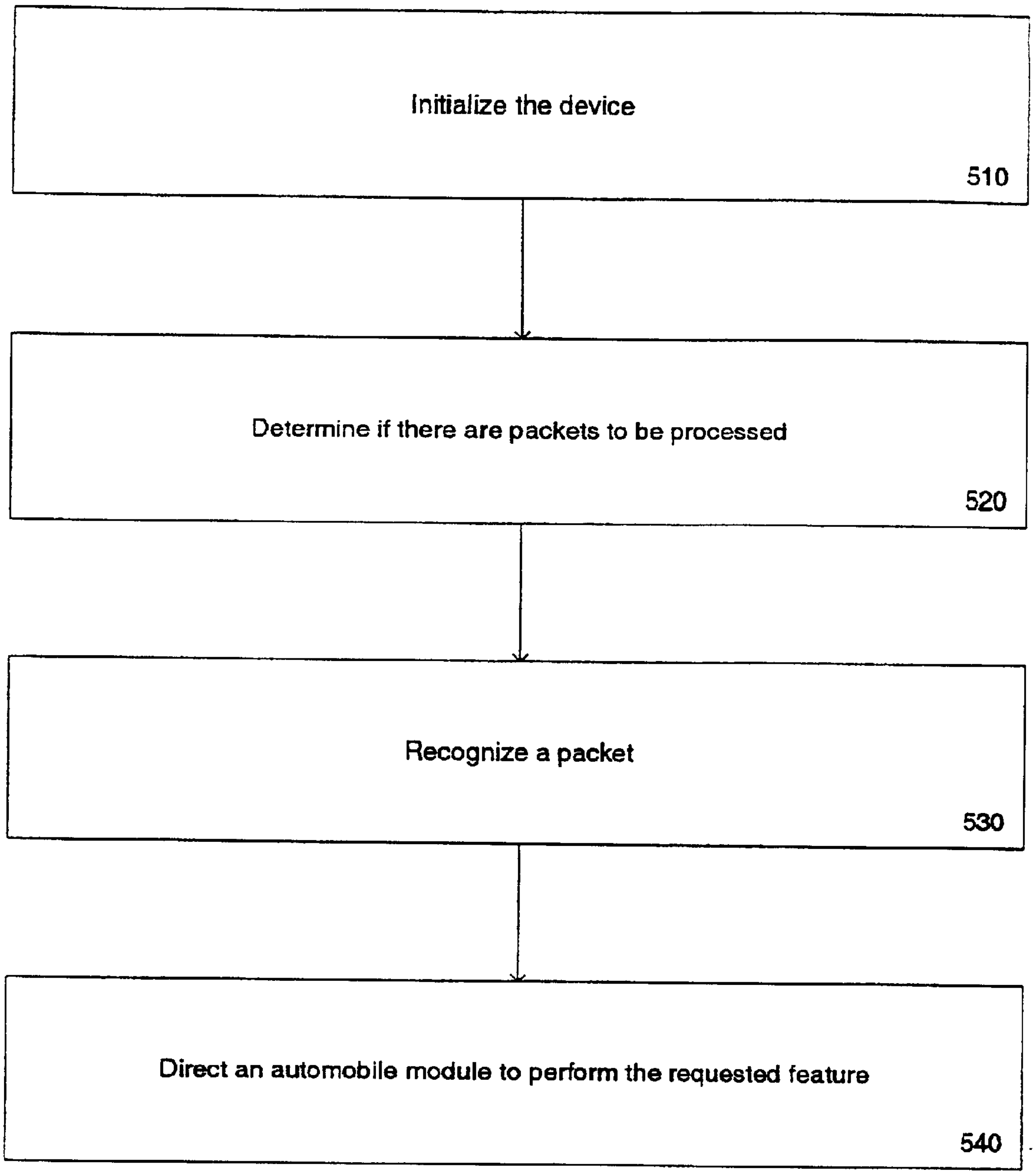
FIG. 5 is a flow diagram showing a process of directing an automobile module to perform an additional feature according to one embodiment of the invention.

FIG. 5 illustrates a process of performing features of the device 10. In one embodiment, a software program is utilized to implement the features of the device 10, which is developed in an assembly language. For example, the software program may be developed utilizing the assembly language defined in the specification for the MicroChip PIC12C672 microcontroller. The assembly languages are well known in the art and do not require any further explanation.

At 510 of FIG. 5 the device 10 is initialized upon the supply of power to the device 10 when the user plugs in the device into an automobile. During the initialization basic operation parameters of the microcontroller are configured. The timer is disabled, the analog-to-digital peripheral (inside the microcontroller) is disabled, and general-purpose 10 cells, i.e. IO cells built into the microcontroller (not shown), are configured to inputs and outputs and set to the appropriate values. The internal microcontroller's random access memory 23 (RAM) containing program variables is initialized with the starting contents.

During the initialization the memory 35 contents are loaded into the RAM 23. Because the loaded contents can be changed by the user, in one embodiment of the invention the contents are loaded from a programmable space 32 of the memory 35, which can be reprogrammed after the time of manufacture of the device 10.

In one embodiment after the data is loaded from the memory 35 into the RAM 23, a cyclic-redundancy-check (CRC) is performed on the data, in order to ensure that no errors occurred during the loading of the data. In one embodiment if the CRC process failed, the microcontroller 20 attempts to load the data from the memory 35 into the RAM 20 a few times, prior to reprogramming the memory 20 with the default parameters stored in a non-programmable space 34 of the microcontroller 20 of FIG. 2.

In addition, during the microcontroller initialization process a sleep timeout counter is set to a default value. In one embodiment the sleep counter that may be located in RAM 23 of FIG. 3 (not shown) is used to determine when the device should enter a low power mode. The counter is periodically decremented until it reaches zero, when the device 10 enters the low power mode. In one embodiment the counter is decremented every time the software goes through a whole processing loop. When the counter counts down to zero, the device goes to sleep. The counter is set to a default value every time the bus activity is detected.

In one embodiment during the initialization process event counters are loaded into the RAM 23 from the memory 35. The counters specify how many times a particular event may happen in order to cause the device 10 to issue an intended response. For example, a counter may be set to three to represent that the power windows up function may be activated upon receipt of three lock signals in succession. In one embodiment, event timeout counters may be loaded into the RAM 23 to specify the amount of time allowed to pass between events prior to event counters reset. For example, to enable the power windows up function, the lock button of the key remote fob may need to be pressed three times in succession, with a delay between each activation of the lock button not exceeding one second. If delay of more than one second is detected between activations of the unlock button, the even counter may be reset and the feature will be activated upon additional three activations of the unlock button in succession.

In one embodiment the microcontroller at 520 of FIG. 5 determines if there are any packets transmitted via the bus that may be processed, by checking the presence of any packets in the bus message buffer. If the are packets present in the buffer, the microcontroller 20 attempts to recognize the packets at 530. Packets that are not recognized by the microcontroller 20 are ignored by the device 10. In one embodiment upon recognizing the packet present in the bus buffer, the microcontroller 20 invokes a particular function by determining the contents of the message in order to direct the appropriate automobile module at 540 of FIG. 5 to perform the requested additional feature. For example, if the message detected in the bus buffer contains a transmission signal the microcontroller determines whether the signal was generated by the automobile system because the user pulled the park brake. If the user did pull the park brake, the microcontroller 20 may invoke a ConfigureDoorLocks function, that based on the user configurations may automatically unlock the doors of the automobile. In one embodiment, if the user configured the device 10 to not respond to the pulled park brake event, the microcontroller 20 does not invoke the ConfigureDoorLock function. If the user configured the device to respond to the pulled park brake event, the ConfigureDoorLocks routine generates a message that is transmitted via the bus to the door control modules of the automobile system to unlock the car doors. In one embodiment if the microcontroller did not detect an acknowledgment message during a predetermined period of time indicating that the car doors are unlocked, the command to unlock the car doors is transmitted again.

In one embodiment if the microcontroller 20 detects a message indicating that the unlock button at the remote keyless entry fob was pressed, the microcontroller determines whether the device is configured to enter the Remote Power Window Control mode. If the device is configured to enter the mode, the microcontroller determines whether the unlock button was pressed the specified number of times in order to activate Remote Power Window Control mode. In one embodiment the microcontroller determines whether the unlock button was pressed three times in succession. Upon determination that the unlock button was pressed the predetermined number of times the WindowsUp routine is invoked in order to send a signal over the bus to raise the windows from the lowered position to the raised position. Upon detection of an obstruction that is not an upper window seal, the WindowsUp routine sends a signal via the bus to lower the windows to the extreme lower position. In one embodiment the WindowsUp routine sends a signal to the bus to lower all the windows to the extreme lower positions if an obstruction was encountered during at least closing of one of the windows. In another embodiment the WindowsUp routine sends a signal to the bus to lower only a window during closing of which an obstruction was detected.

In one embodiment in order for the WindowsUp routine to accurately detect an obstruction, the microcontroller 20 may utilize a parameter specifying the full windows length to be traveled by the window in order to reach the upper window seal. In one embodiment if an obstruction was encountered and the window traveled less than the distance specified by the parameter, then the WindowsUp routine sends the signal to the bus to lower the windows because the obstruction cannot be an upper windows seal. If the windows are partially up already, then the WindowsUp routine subtracts the distance value representing the position of the windows from the full window length parameter. In one embodiment the full window length parameter is determined by requiring the user to lower the windows to the extreme lowered position and then raise them to the extreme raised position during the configuration of the device 10, in order for the device 10 to determine the length to be traveled by the windows in order to reach the upper window seal.

In one embodiment the microcontroller 20 includes a received packets space 31 and a transmitted packets space 33. The receive packets space 31 comprises a set of packets that are recognizable by the microcontroller 20 and may be found in the diagnostic port's buffer. The transmitted packets space 33 comprises a set of packets that the microcontroller 20 may transmit to an automobile module in order to activate a requested additional automobile feature. In one embodiment the microcontroller 20 compares a packet detected on the bus to the packets in the received packets space 31 of the memory 35. If the packet matches a packet in the received packets space 31, then the microcontroller 20 processes the packet. If the packet does not match any packet in the received packets space 31, the packet is ignored by the microcontroller 20. Upon processing of a recognized packet and determination of an additional feature that is requested by the user of the automobile, the microcontroller 20 transmits a packet from the transmitted packets space 33 including a command to perform the additional feature requested by the automobile user.

It will be noted that the above-described method and system are not limited to the OBD-II bus and can be utilized with any automobile diagnostic port's bus. In addition, it will be noted that the system and method are not limited to only the features described above and additional features can be implemented utilizing the above described system and method. Moreover, the above-described system and method are not limited to the described feature activation combinations and a sequence of any events including, but not limited to, pressing buttons on the Driver's Information Center and pressing buttons on the remote key fob may be utilized.

It will be appreciated that the above-described system may be implemented in hardware or software, or by a combination of hardware and software. In one embodiment, the above-described system may be provided in a machine-readable medium. The machine-readable medium may include any mechanism that provides information in a form readable by a machine, e.g. a computer. For example, a machine-readable medium may include read only memory (ROM); random access memory (RAM), magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

receiving an indication of an event initiated by an automobile user;

determining an additional automobile feature corresponding to the event;

directing an automobile module via a diagnostic port of an automobile to perform the additional automobile feature.

2. The method of claim 1 wherein the directing the automobile module comprises directing the automobile module via a diagnostic port's bus.

3. The method of claim 2 wherein the diagnostic port's bus is an OBD-II bus.

4. The method of claim 2 wherein the event causes an activity on the diagnostic port's bus.

5. The method of claim 1 wherein the event is initiated by the automobile user pressing a button on an automobile display panel.

6. The method of claim 1 wherein the event in initiated by the automobile user pressing a button on a remote key fob.

7. The method of claim 1 wherein the additional automobile feature is lowering automobile windows when an automobile key is not in an ignition.

8. The method of claim 1 wherein the additional automobile feature is raising automobile windows when an automobile key is not in an ignition.

9. The method of claim 8 further comprising detecting an obstruction.

10. The method of claim 9 wherein the automobile windows are lowered if the obstruction is detected.

11. The method of claim 1 wherein the additional automobile feature is providing the automobile user with a highest speed of the automobile in a predetermined time interval.

12. The method of claim 11 wherein the highest speed is provided to the automobile user via a speedometer needle.

13. The method of claim 1 wherein the additional automobile feature is locking a tachometer needle in a particular position.

14. The method of claim 13 wherein the additional automobile feature is locking a speedometer needle in a particular position.

15. The method of claim 1 wherein the additional automobile feature is providing power to automobile accessories when an automobile key is not in an ignition.

16. The method of claim 1 wherein the additional automobile feature is unlocking automobile doors upon park brake activation.

17. The method of claim 1 wherein the automobile is a Chevrolet Corvette.

18. An apparatus comprising:

a device to communicate with automobile modules via a diagnostic port of an automobile, the device to provide an automobile user with an additional automobile feature in response to an event initiated by the automobile user.

19. The apparatus of claim 18 wherein the device comprises a microcontroller.

20. The apparatus of claim 18 wherein the device to communicate with the automobile modules via a diagnostic port's bus.

21. The apparatus of claim 20 wherein the diagnostic port's bus is an OBD-II bus.

22. The apparatus of claim 20 wherein the event causes an activity on the diagnostic port's bus.

23. The apparatus of claim 18 wherein the event initiated by the automobile user is selection of automobile display panel buttons by the automobile user.

24. The apparatus of claim 18 wherein the event initiated by the automobile user is selection of remote key fob buttons by the automobile user.

25. The apparatus of claim 18 wherein the additional automobile feature is to unlock automobile doors upon activation of a park brake.

26. The apparatus of claim 18 wherein the additional automobile feature is to lower automobile windows when an automobile key is not in an ignition.

27. The apparatus of claim 18 wherein the additional feature is to supply power to automobile accessories when an automobile key is not in an ignition.

28. The apparatus of claim 1 wherein the additional feature is to raise automobile windows when an automobile key is not in an ignition.

29. A processing system comprising:

a processor; and a storage medium having stored therein instructions which, when executed by the processor, cause the processing system to perform a method comprising:

communicating with automobile modules via a diagnostic port in response to an event initiated by an automobile user; and providing the automobile user with an additional automobile feature.

30. The processing system of claim 29 wherein the providing the automobile user with the additional automobile feature comprises directing an automobile module to perform the additional automobile feature.

31. The processing system of claim 29 wherein the communicating with the automobile modules via the diagnostic port comprises communicating with the automobile modules via a diagnostic port's bus.

32. The processing system of claim 31 wherein the diagnostic port's bus is an OBD-II bus.

33. The processing system of claim 29 wherein the additional feature is to unlock automobile doors upon activation of a park brake.

34. The processing system of claim 29 wherein the additional feature is to supply power to automobile accessories when a key is not in an ignition.

35. The processing system of claim 29 wherein the event initiated by the automobile user is selection of automobile display panel buttons.

36. The processing system of claim 29 wherein the event initiated by the automobile user is selection of remote key fob buttons by the automobile user.

37. A machine-readable medium that provides instructions, which when executed by a machine, cause the machine to perform operations comprising:

receiving an indication of an event initiated by an automobile user;

determining an additional automobile feature corresponding to the event; and directing an automobile module via a diagnostic port of an automobile to perform the additional feature.

38. The machine-readable medium of claim 37 wherein the directing the automobile module via the diagnostic port comprises directing the automobile module via a diagnostic port' bus.

39. The machine-readable medium of claim 38 wherein the diagnostic port's bus is an OBD-II bus.

40. The machine-readable medium of claim 38 wherein the additional feature is to unlock automobile doors upon activation of a park brake.

41. The machine-readable medium of claim 38 wherein the event initiated by the automobile user is selection of automobile display panel buttons by the automobile user.

42. An apparatus comprising:

means for receiving an indication of an event initiated by an automobile user;

means for determining an additional automobile feature corresponding to the event;

means for directing an automobile module via a diagnostic port of an automobile to perform the additional automobile feature.

43. The apparatus of claim 42 wherein the means for directing the automobile module via the diagnostic port comprises means for directing the automobile module via a diagnostic port's bus.

44. The apparatus of claim 43 wherein the diagnostic port's bus is an OBD-II bus.

45. The apparatus of claim 43 wherein the event causes an activity on the diagnostic port's bus.

* * * * *